United States Patent Office 2,903,470
Patented Sept. 8, 1959

2,903,470

REACTION PRODUCT OF ALUMINUM HYDRIDE AND A BORIC ACID ESTER

Janos Kollonitsch, Salem, Mass., assignor to Metal Hydrides Incorporated, Beverly, Mass., a corporation of Massachusetts No Drawing. Application September 16, 1957
Serial No. 683,953

18 Claims. (Cl. 260—448)

This invention relates to new compounds having the general formula

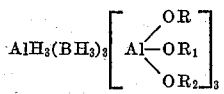

in which R, $R_1$ and $R_2$ are monovalent radicals selected from the group consisting of alkyl, cycloalkyl, alkenyl, aralkyl or an alkyl radical substituted with a halogen and in which R, $R_1$ and $R_2$ may be the same or different radicals. The invention also relates to a method of preparing these new compounds.

These new compounds are useful as reducing agents for reducing various organic and inorganic compounds, such as for reducing aldehydes to carbinols, nitriles to amines and carboxylic acid esters to primary carbinols. Some of these new compounds are crystalline or glassy solids and others are liquids with a tendency to supercooling. They are stable compounds and are soluble in a variety of solvents, such as diethyl ether, benzene, hexane, chloroform, carbon tetrachloride and tetrahydrofuran, the solubility varying with the specific compound and specific solvent. The thermal stability of these compounds varies, some being distillable while others decompose before reaching the distillation temperature.

The new compounds of the invention may be prepared by reacting aluminum hydride with an ester of boric acid in a liquid carrier at a temperature below the temperature at which aluminunm hydride decomposes. Preferably, the temperature used is between 0° C. and normal room temperature. Suitable liquid carriers are the ethers, such as diethyl ether, tetrahydrofuran, dibutyl ether or the dimethyl or diethyl ethers of the diethylene glycols, and hydrocarbon solvents, such as hexane, cyclohexane or benzene, or mixtures of an ether and a hydrocarbon solvent. If the liquid carrier is not a solvent for aluminum hydride, preferably, a solvent is mixed with the liquid carrier in an amount sufficient to dissolve the aluminum hydride. The reaction is illustrated by the reaction of aluminum hydride with methyl borate as shown by the equation:

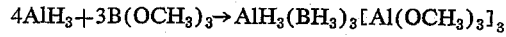

One or more moles of methyl borate in the above equation may be replaced by the boric acid ester of a different alcohol.

As illustrative of esters of boric acid which may be used in the practice of the invention, I may mention ethyl borate, isopropyl borate, trihexyl borate, methyl borate, n-propyl borate, n-butyl borate, tertiary butyl borate, secondary butyl borate, n-amyl borate, tertiary amyl borate, methyl isobutyl carbinyl borate, 3-heptyl borate, di-isopropyl carbinyl borate, n-octyl borate, 2,6,8-trimethyl-4-nonyl borate, triallyl borate, oleyl borate, stearyl borate, 2-methyl-2,4-pentanediol borate, tribenzyl borate, tri-p-methyl benzyl borate, tri-o-methyl benzyl borate, tri-(2-phenyl cyclohexyl) borate, 1,3-dichloro-2-propyl borate, tricyclohexyl borate, tricyclopentyl borate, tricycloheptyl borate, and mixtures thereof.

The invention is illustrated further by the following examples.

Example 1

Over a period of ten minutes a solution of 35.4 grams of trihexyl borate in 150 ml. of diethyl ether was dropped into a solution of 4.45 grams of aluminum hydride in 74 ml. of diethyl ether with stirring and cooling to 0° C. The solution was clear but on standing 24 hours, a white crystalline precipitate settled out. This was filtered off in a nitrogen atmosphere and dried in vacuo at a maximum temperature of 70° C. Part of the product remained in solution and was recovered by evaporating the ether from the filtrate. In an attempt to distill this product under a pressure of 1 mm. of mercury, no distillation was observable at a temperature of 180° C. but above this temperature some decomposition occurred.

Example 2

A solution of 40.3 grams of tri-(2-phenyl cyclohexyl) borate in 120 ml. of tetrahydrofuran was dropped into a solution of 3 grams of aluminum hydride in 60 ml. of diethyl ether over a period of 20 minutes under a nitrogen atmosphere with cooling to 8° to 12° C. Little heat was evolved. The solvents were pulled off the clear solution in vacuo at a maximum temperature of 100° C. The product was a thick, semi-solid material.

Example 3

A solution of 0.95 gram of aluminum hydride in 30 ml. of dimethyl ether of diethylene glycol was prepared as follows. Lithium aluminum hydride was reacted with aluminum chloride in diethyl ether and the lithium chloride formed was removed by filtration. Then, 30 ml. of dimethyl ether of diethylene glycol was added to the filtrate and the contained diethyl ether was distilled off in vacuo to obtain a solution of the aluminum hydride in the dimethyl ether of diethylene glycol.

To the solution of 0.95 gram of aluminum hydride in the remaining 30 ml. of dimethyl ether of diethylene glycol was dropped a solution of 5.7 ml. of isopropyl borate in 15 ml. of the above ether under a nitrogen atmosphere with cooling to 8° to 10° C. Then the ether was distilled off in vacuo and the remaining liquid distilled at a pressure of 1 mm. At a temperature of about 120° to 122° C., a product represented by the formula

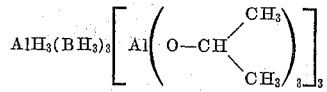

was obtained in good yield. The product had the following analytical values in percent by weight:

| Element | Found | Calculated |
|---|---|---|
| Al | 15.7 | 15.73 |
| C | 46.48 | 47.3 |
| H (total) | 10.88 | 11.01 |
| H (active) | 1.74 | 1.78 |
| B | 4.43 | 4.73 |

In another run, this compound was prepared in the same manner as above except that diethyl ether was used instead of the dimethyl ether of diethylene glycol.

Example 4

270 ml. of a diethyl ether solution containing 11.4 grams of lithium aluminum hydride was cooled to 10° C. and then, with stirring and cooling, a solution of 13.5 grams of aluminum chloride in 100 ml. of ether was added over a period of ten minutes. The lithium chloride was filtered out and then a solution of 30.9 grams of methyl borate was dropped into the aluminum hydride solution over a period of 15 minutes with stirring and cooling to a temperature between 10° C. and 20° C. The fine white precipitate was filtered, washed with ether and dried at 30° C. with a pressure of 1 mm. The white crystalline powder weighed 36.7 grams.

*Example 5*

A solution of 7.5 grams of tri-sec-butyl borate in 5 ml. of diethyl ether was dropped into a solution of 1 gram of aluminum hydride in 25 ml. of diethyl ether with stirring. The temperature was held between minus 5° C. and 0° C. for 15 minutes. Then the ether was distilled off and the product distilled. The product obtained weighed 6.8 grams and was a colorless, viscous liquid having a boiling point of 118–123° C. at 0.5 mm. of mercury. The product analyzed 52.84 percent carbon and 11.40 percent hydrogen by weight whereas the calculated percentages of these elements is 53.25 percent and 11.58 percent respectively.

*Example 6*

17 grams of the product obtained in Example 3 was dissolved in 50 ml. of dry benzene and to this solution was added a solution of 16 grams of ethyl benzoate in 50 ml. of dry benzene. The solution was refluxed for 30 minutes. Then, 60 ml. of 5 N hydrochloric acid and 60 ml. of water was added. The benzene layer was washed with an aqueous sodium bicarbonate solution and again with water and then dried with magnesium sulphate. The benzene was distilled off and the remainder fractionated under a pressure of 1 mm. Between 85° and 90° C., benzyl alcohol was obtained with a yield of 77 percent of theoretical.

I claim:

1. A compound having the formula

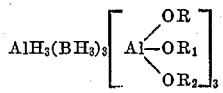

in which R, $R_1$ and $R_2$ are monovalent radicals selected from the group consisting of alkyl, cycloalkyl, alkenyl, aralkyl and an alkyl radical substituted with a halogen.

2. A compound having the formula $$AlH_3(BH_3)_3[Al(OR)_3]_3$$

where R is 2-phenyl cyclohexyl.

3. A compound having the formula $$AlH_3(BH_3)_3[Al(OR)_3]_3$$

where R is methyl.

4. A compound having the formula $$AlH_3(BH_3)_3[Al(OR)_3]_3$$

where R is isopropyl.

5. A compound having the formula $$AlH_3(BH_3)_3[Al(OR)_3]_3$$

where R is n-hexyl.

6. A compound having the formula $$AlH_3(BH_3)_3[Al(OR)_3]_3$$

where R is secondary butyl.

7. The method for preparing a compound having the formula

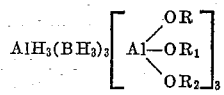

which comprises reacting aluminum hydride with at least one boric acid ester selected from esters having the formulas $$B(OR)_3, B(OR_1)_3 \text{ and } B(OR_2)_3$$

in the proportion of four moles of aluminum hydride to each three moles of ester in an inert liquid carrier containing a solvent for aluminum hydride, R, $R_1$ and $R_2$ being radicals selected from the group consisting of alkyl, cycloalkyl, alkenyl, aralkyl and an alkyl radical substituted with a halogen, and separating said compound from the liquid carrier.

8. The method as claimed by claim 7 wherein the solvent is an ether.

9. The method as claimed by claim 7 wherein the boric acid ester is tri-2-phenyl cyclohexyl borate.

10. The method as claimed by claim 7 wherein the boric acid ester is trimethyl borate.

11. The method as claimed by claim 7 wherein the boric acid ester is triisopropyl borate.

12. The method as claimed by claim 7 wherein the boric acid ester is tri-n-hexyl borate.

13. The method as claimed by claim 7 wherein the boric acid ester is tri-secondary butyl borate.

14. The method for preparing a compound having the formula $$AlH_3(BH_3)_3[Al(OR)_3]_3$$

where R is an alkyl radical which comprises reacting aluminum hydride with a trialkyl borate in the proportion of four moles of aluminum hydride to each three moles of said borate in an inert liquid carrier containing a solvent for aluminum hydride, and separating said compound from the liquid carrier.

15. The method for preparing a compound having the formula $$AlH_3(BH_3)_3[Al(OR)_3]_3$$

where R is an aralkyl radical which comprises reacting aluminum hydride with a triaralkyl borate in the proportion of four moles of aluminum hydride to each three moles of said borate in an inert liquid carrier containing a solvent for aluminum hydride, and separating said compound from the liquid carrier.

16. The method for preparing a compound having the formula $$AlH_3(BH_3)_3[Al(OR)_3]_3$$

where R is a cycloalkyl radical which comprises reacting aluminum hydride with a tricycloalkyl borate in the proportion of four moles of aluminum hydride to each three moles of said borate in an inert liquid carrier containing a solvent for aluminum hydride, and separating said compound from the liquid carrier.

17. The method for preparing a compound having the formula $$AlH_3(BH_3)_3[Al(OR)_3]_3$$

where R is an alkyl radical substituted with a halogen which comprises reacting aluminum hydride with a halogenated trialkyl borate in the proportion of four moles of aluminum hydride to each three moles of said borate in an inert liquid carrier containing a solvent for aluminum hydride, and separating said compound from the liquid carrier.

18. The method for preparing a compound having the formula $$AlH_3(BH_3)_3[Al(OR)_3]_3$$

where R is an alkylene radical which comprises reacting aluminum hydride with a trialkylene borate in the proportion of four moles of aluminum hydride to each three moles of said borate in an inert liquid carrier containing a solvent for aluminum hydride, and separating said compound from the liquid carrier.

References Cited in the file of this patent

UNITED STATES PATENTS 2,494,968    Schlesinger et al. ........ Jan. 17, 1950

OTHER REFERENCES

Gaylord: Reduction With Complex Metal Hydrides, page 14 (1956).